June 11, 1935.  G. E. HULSE  2,004,503
CONTROL APPARATUS FOR REFRIGERATION MACHINES
Filed Nov. 24, 1930   7 Sheets-Sheet 1
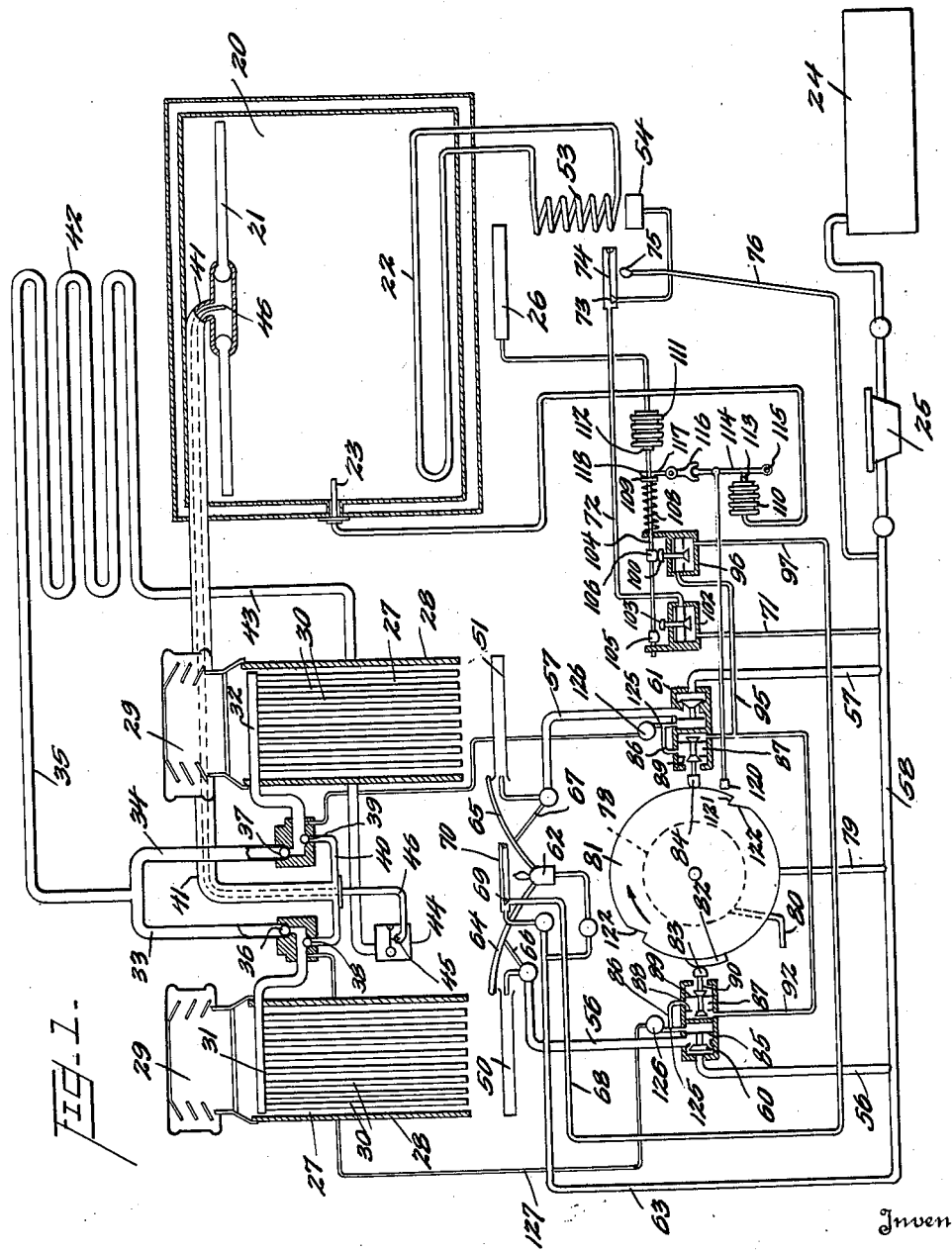

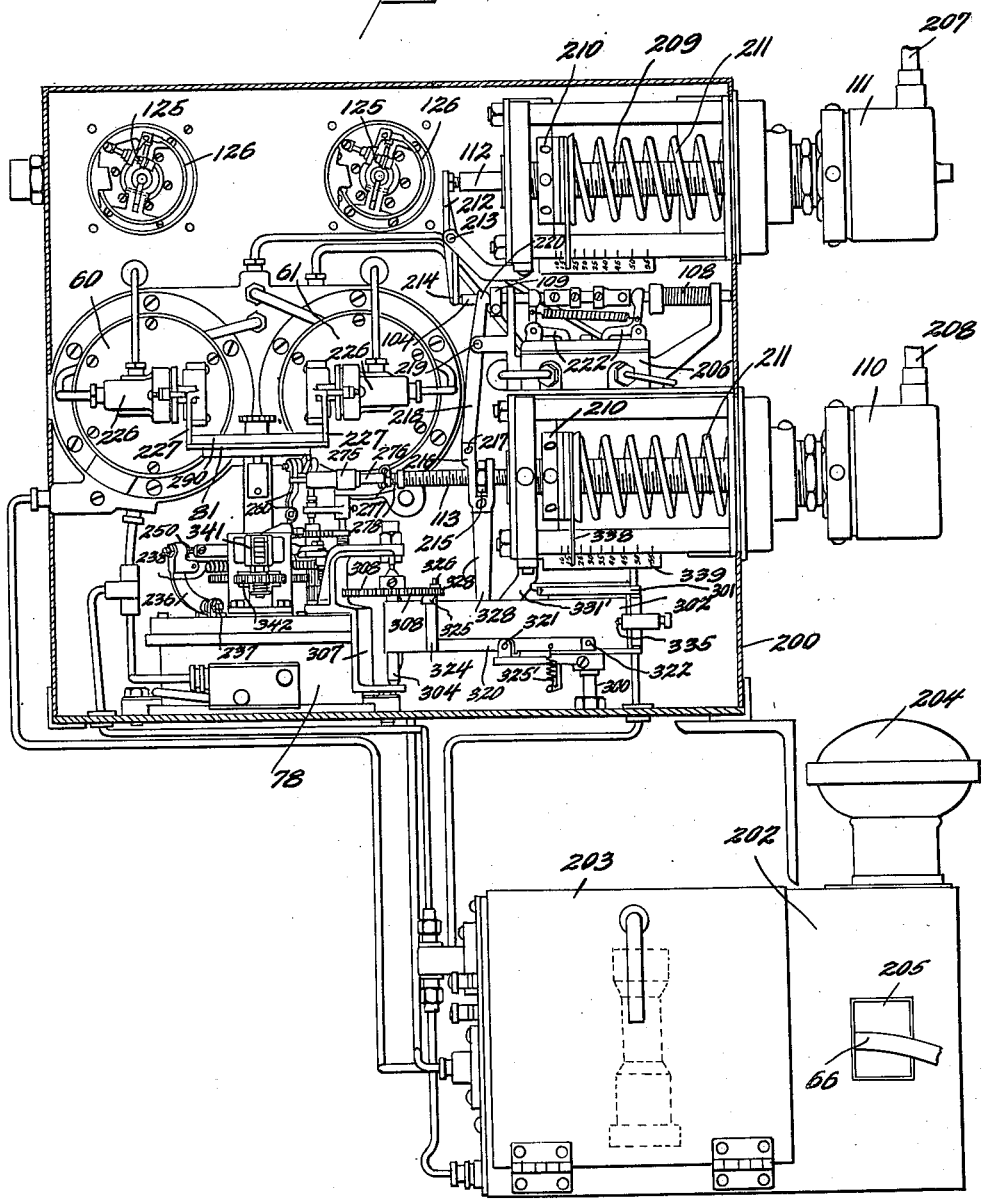

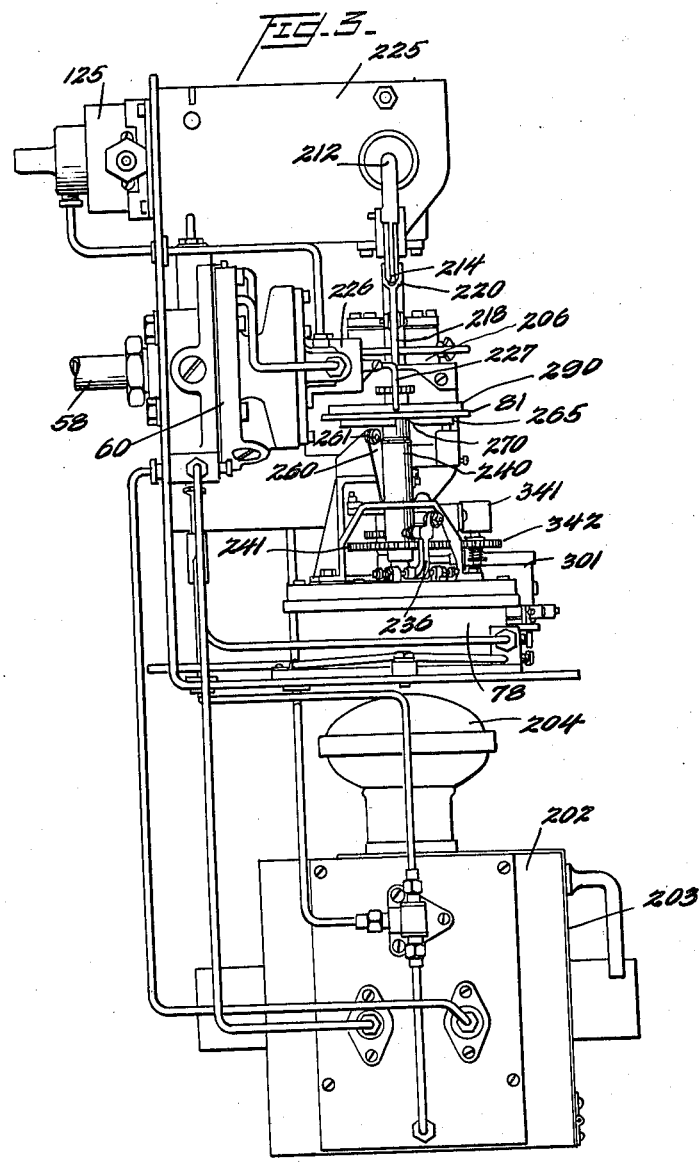

June 11, 1935.  G. E. HULSE  2,004,503
CONTROL APPARATUS FOR REFRIGERATION MACHINES
Filed Nov. 24, 1930  7 Sheets-Sheet 4
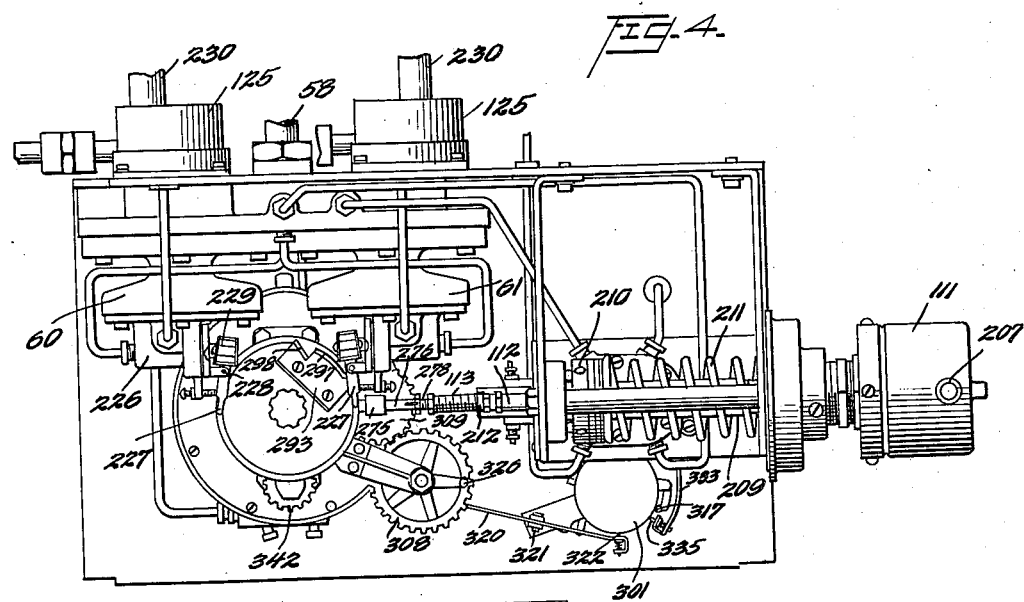
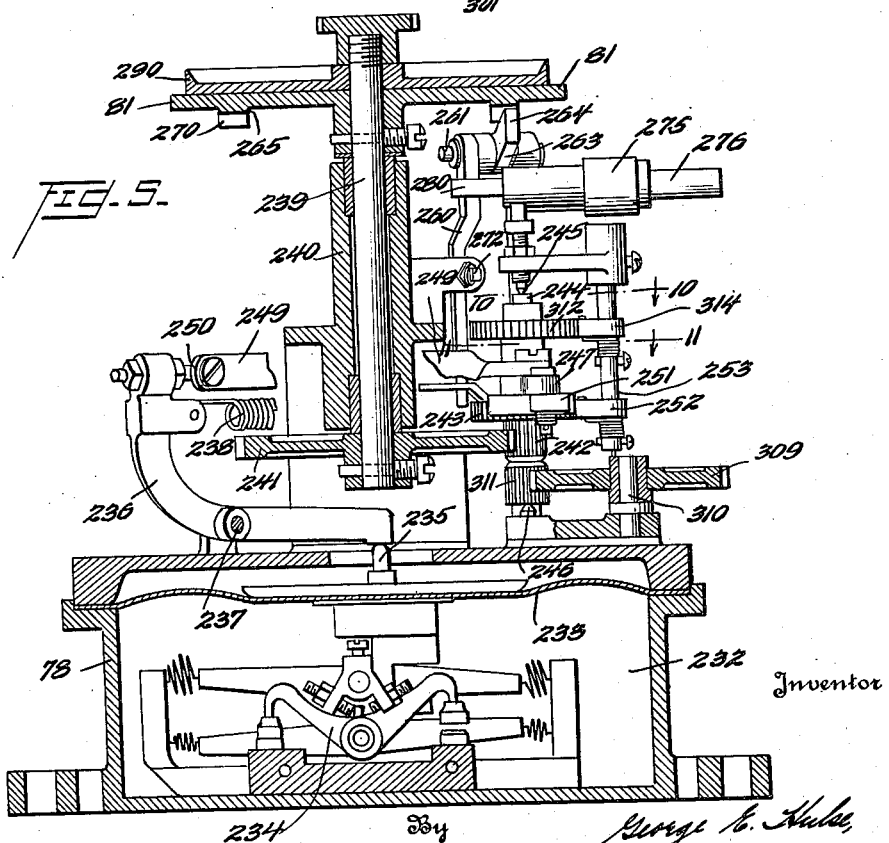

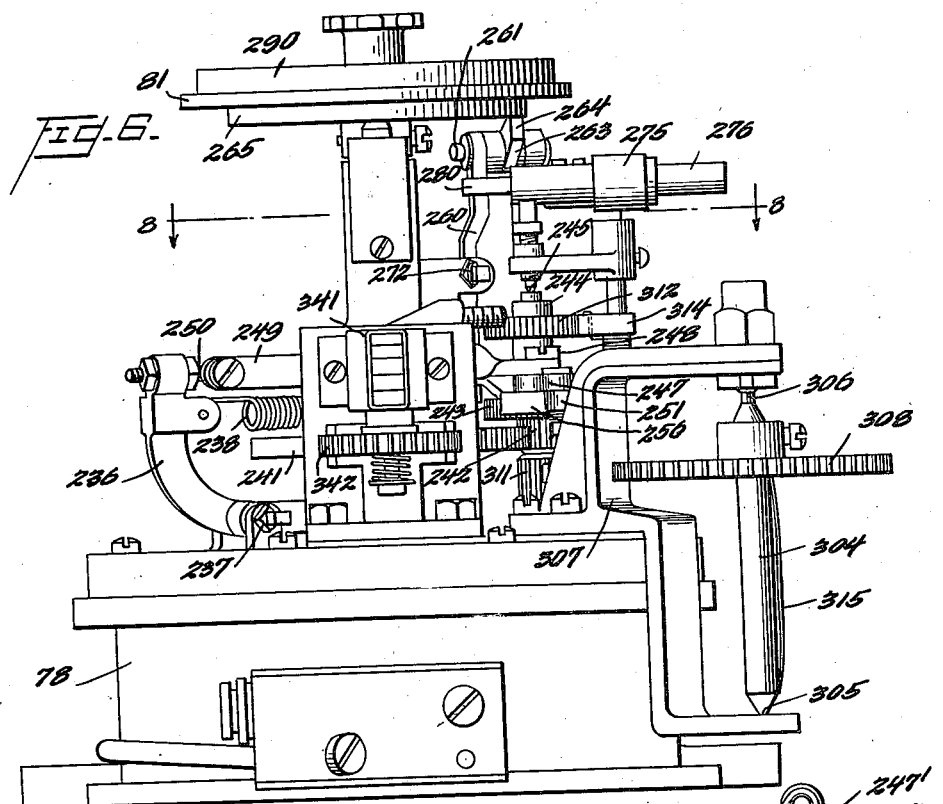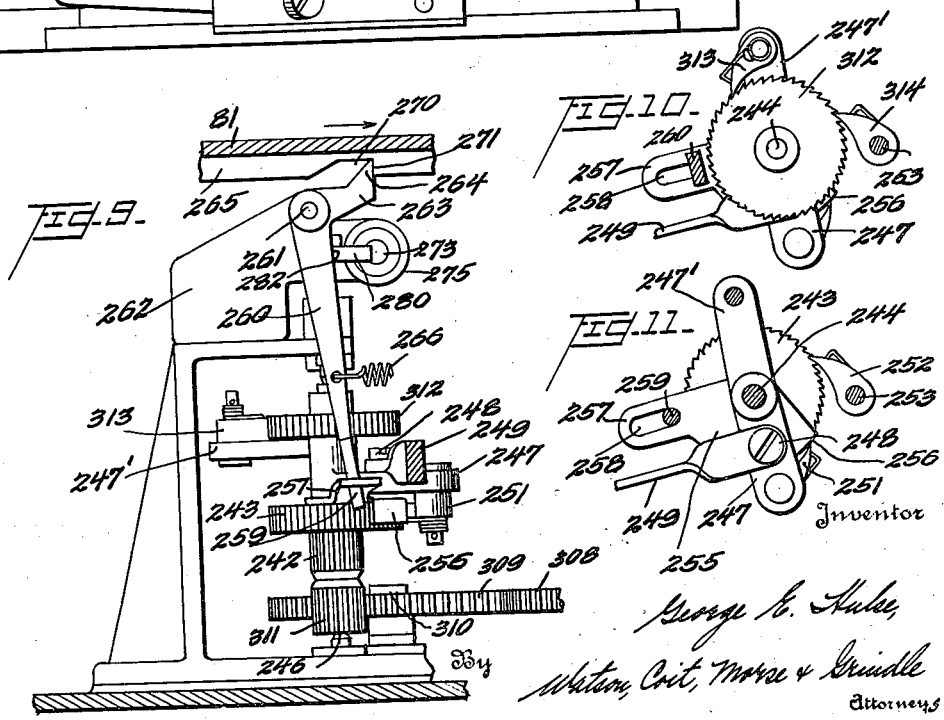

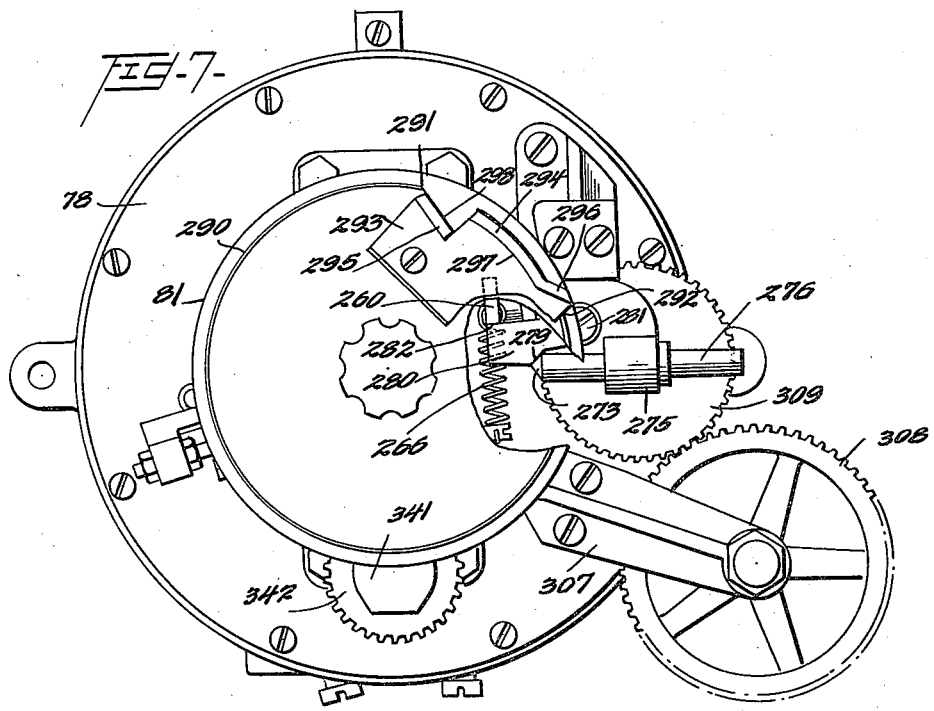
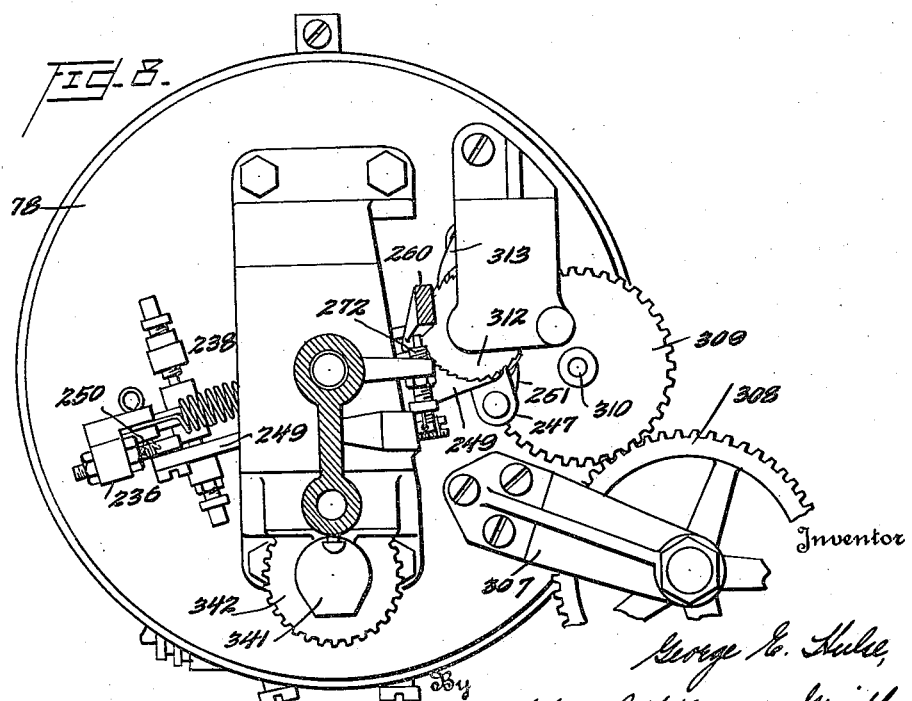

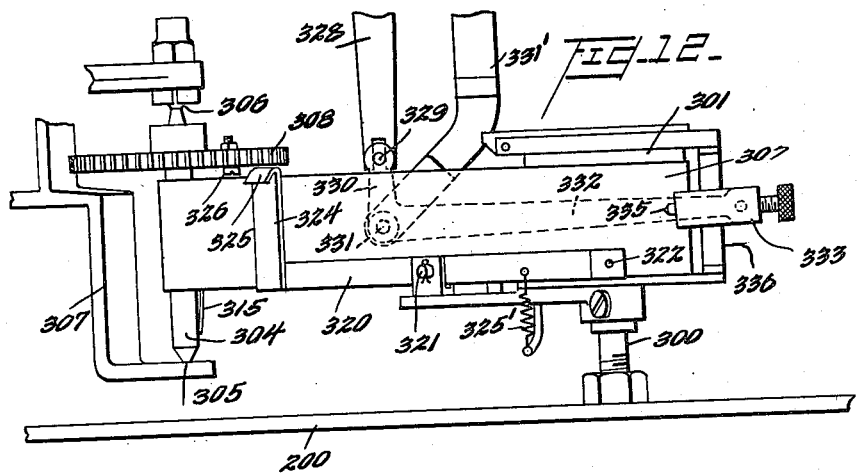
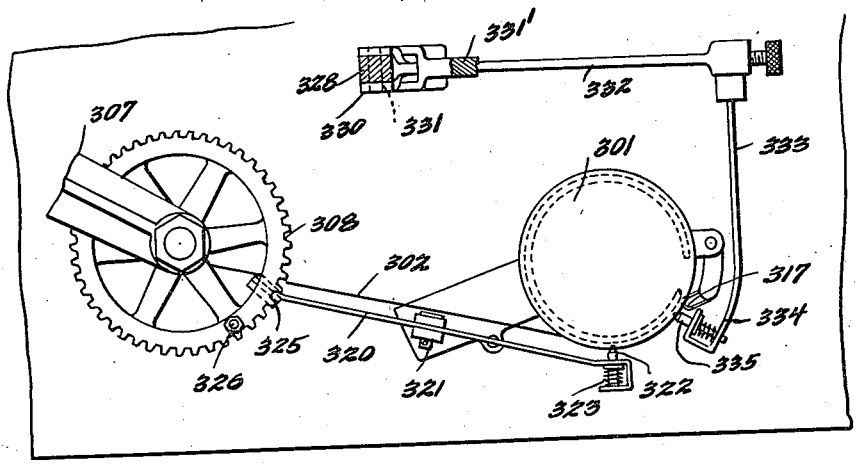
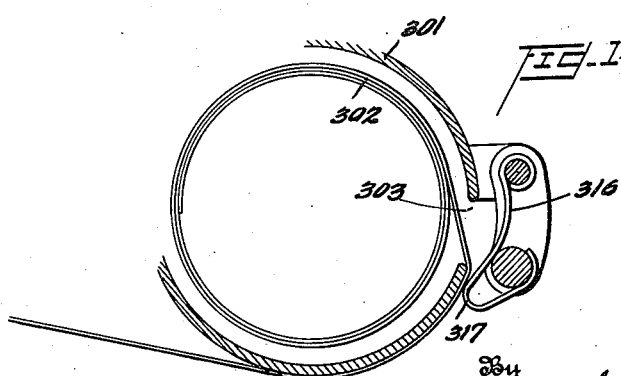

Patented June 11, 1935

2,004,503

UNITED STATES PATENT OFFICE 2,004,503

CONTROL APPARATUS FOR REFRIGERATION MACHINES

George E. Hulse, New Haven, Conn., assignor to The Safety Car Heating & Lighting Company, a corporation of New Jersey Application November 24, 1930, Serial No. 497,879

36 Claims. (Cl. 257—8)

This invention relates to a method of, and apparatus for temperature control by refrigeration and heating wherein heat is used in the operation of the refrigeration apparatus.

It is a general object of the present invention to provide a novel method and apparatus of the type described.

More particularly it is an object of the invention to provide a method of, and apparatus for automatically selecting and putting into operation refrigeration or heating apparatus for maintaining a desired temperature within a compartment, wherein the operation of both the heating and the refrigerating apparatus is under the control of outside and compartment temperature.

Among the more important features of novelty of the invention may be enumerated the following:

A. The automatic selection and operation of heating and cooling apparatuses under the control of thermo-responsive elements, one within the conditioned compartment and the other outside of the compartment wherein the first exercises primary control and the second subsidiary control.

B. The use of improved mechanically actuated pilot valves for controlling the flow of a fluid to fluid-actuated main valves for distributing fuel selectively to one or more of several burners.

C. The use of a mechanical interconnection between the fuel distributing means and one of the thermo-responsive means.

D. The use of means for stopping the flow of fuel to the whole system upon the obtaining of excess pressure in parts of the refrigeration apparatus.

E. The use of automatic mechanism for distributing fuel to the heaters of a multi-unit refrigeration apparatus together with associated apparatus for shutting off the flow of fuel at the end of a selected period of time; and thermo-responsive means for again permitting the flow of fuel for a predetermined time in spite of any further change in condition of the thermo-responsive means.

F. The use of a fuel-flow actuated motor for operating fuel valve controlling mechanism, together with thermo-responsive means for isolating said mechanism from said motor.

G. Apparatus associating the fuel flow operated motor, the fuel valve actuating mechanism, and thermo-responsive mechanism whereby fuel valves are initially permitted to be actuated under the control of the thermo-responsive means and thereafter are retained in their actuated condition by the motor means for a predetermined period.

H. The use of a recording mechanism continuously associating the operation of the fuel-flow motor with the condition of one of the thermo-responsive elements whereby a time-temperature record is produced.

Other and further features and objects of the invention, which have here, for the sake of simplicity, been shown and described in conjunction with a railway car, will be more apparent to those skilled in the art as the description proceeds.

Where, in the following specification and drawings, specific embodiments have been shown and described, it will be understood that they are subject to such changes and variations, substitutions and equivalents as fall within the scope of the appended claims.

In said drawings:

Figure 1 is a schematic and diagrammatic illustration of the invention;

Figure 2 is a front elevation of the essential parts of the control unit;

Figure 3 is a side elevation thereof showing most of the casing removed from the apparatus;

Figure 4 is a plan view thereof;

Figure 5 is a vertical, central section through the fluid driven motor and directly associated parts;

Figure 6 is an elevation of the apparatus shown in Fig. 5;

Figure 7 is a plan view of the apparatus of Fig. 6;

Figure 8 is a horizontal section of the motor taken on line 8—8 of Fig. 6;

Figure 9 is a detail of part of the motor mechanism showing the drive for the timing disk, the full cycle control, and associated parts;

Figure 10 is a section on line 10—10 of Fig. 5 showing in detail the ratchet drive from the motor to the recording mechanism;

Figure 11 is a section on line 11—11 of Fig. 5 showing in detail the ratchet drive for the valve operating cam disk;

Figure 12 is an elevation of the recording apparatus and timing device;

Figure 13 is a plan view of the apparatus of Fig. 12; and

Figure 14 is a detailed section, on a large scale, of the tape casing and datum marker.

The present invention deals particularly with a method of and means for maintaining a substantially constant, desired temperature within a storage compartment. In the present instance this compartment is a railway car, but it is obvious that the invention could be applied to a great many other purposes. Railway cars, in traveling about the country, are subject to various atmospheric temperatures, but it is often desirable that the load be maintained at a fixed temperature, either low or high in accordance with the character of the load. Obviously, the car may pass into localities where the temperature of the atmospheric air is at times above and at times below the desired temperature within the compartment, and means are therefore provided for supplying heat to the compartment, for removing heat from the compartment, and not only for selecting the proper apparatus to be put into operation, but also for controlling the selected apparatus in accordance with the temperature within the compartment which will not change as rapidly as outside temperature may change.

In the drawings and having particular reference first to Figure 1, wherein substantially the whole invention is disclosed schematically, there is shown at 20 the storage compartment of a railway car. Near the roof of this compartment is arranged a cooling unit or evaporator 21 of any desired type wherein a liquid refrigerant is evaporated to absorb heat from the compartment. Preferably near the floor or along the walls near the bottom of the compartment are arranged heating means such as the coils 22 filled with a suitable liquid for conducting heat into the compartment. A third element 23 is arranged within the car and comprises a thermo-responsive element, such, for instance, as a bulb filled with a highly volatile liquid. The remainder of the apparatus shown in the drawing is conveniently and compactly arranged in a small compartment, not shown, at one end of the car. The only exceptions to this are the condenser, the fuel tank 24, the regulator 25, certain of the pipe lines, and the thermo-responsive element 26 which may be constructed similarly to the element 23. These parts are preferably arranged outside of the car.

The refrigeration apparatus is of the cyclically-operated, adsorption type, although it will be evident that other types of refrigeration apparatus such as those working on the absorption principle can be used. At 27 are shown two absorber units, each comprising a tubular casing 28 surmounted by a ventilator 29 which projects through the car roof. Each casing has arranged therein a plurality of tubes 30 filled with a suitable adsorbent material such as silica gel. The adsorbent tubes in the two adsorbers are respectively connected to the headers 31 and 32. These headers are connected to the hot vapor pipes 33 and 34 which are joined into the single vapor pipe 35, and interposed in the connections are the check valves 36 and 37 permitting flow from the adsorbers but not to them.

A second set of check valves 38 and 39 is also associated with the headers 31 and 32 in such a manner that flow can be toward the headers but not from them through these valves. The outlets from the valves 38 and 39 are connected by pipe 40 to the cold vapor pipe 41 leading to the upper portion of the evaporator 21. The hot vapor pipe 35 leads to an air cooled condenser 42, which can conveniently be arranged on the roof of the car, and from this condenser leads a liquid refrigerant line 43 which discharges into a receiver 44 having a float controlled valve 45 for regulating the flow of liquid refrigerant into the pipe 46 which returns it to the evaporator.

The operation of such a refrigeration system is well understood. A suitable refrigerant liquid is used, the vapor of which is adsorbed, through the pipe 41, into the adsorbent material and in so doing lowers the pressure on the surface of the liquid in the evaporator so that further evaporation takes place and consequent heat adsorption from the compartment. When one of the adsorbers becomes saturated with refrigerant, it is heated by means of a suitable heater and the refrigerant driven off in the form of a vapor through the pipe line 35 to the condenser where it is liquefied, delivered to the receiver 44 and thence, under the control of the float valve, to the evaporator for reuse. In order that refrigeration can be more nearly continuous, two adsorbers are provided which are heated alternately, the other receiver at that time being in a condition to adsorb.

In accordance with the present invention, the heaters for the two adsorbers are in the form of gas burners 50 and 51, respectively, which receive their fuel through a system of pipes, to be described, from the tank 24 charged with a suitable fuel, such as propane, under pressure so that it is liquefied. This fuel, upon the release of the pressure, vaporizes and passes into the pressure regulator 25 where the pressure is suitably regulated for burning.

To supply heat to the compartment 20, the coils 22 are arranged in circuit with a suitable heating unit 53 in such a manner that the heated fluid flows, by thermo-syphon action, when heat is supplied to the unit 53 by means of the burner 54 supplied with fuel in the same manner as are the burners 50 and 51.

Gas is supplied to the adsorber burners 50 and 51 through the branch pipes 56 and 57 from the main fuel line 58 leading from the regulator 25. Interposed in the lines 56 and 57 are the diaphragm actuated main burner valves 60 and 61 for controlling the flow of fuel therethrough. The main burners are arranged to be lighted by means of a pilot burner 62 directly supplied with gas from the main pipe 58 by means of the pipe line 63. This pilot is spaced some distance from and between the two burners and is associated with them by means of the jumpers 64 and 65, respectively, each of which takes gas from its main burner pipe 56 and 57, respectively, through the tubes 66 and 67. These jumpers comprise perforated tubes, the outer ends of which are in proximity to the main burners and the inner ends to the pilot burner. When either jumper is supplied with gas, that escaping near the pilot burner will be ignited, and the flame will jump from perforation to perforation along the length of the jumper to ignite the gas issuing from the main burner.

Gas is used for the control and timing of the main burners and for this purpose is taken from the pipe line 63 supplying the pilot burner 62 and interposed between the pipe 63 and 68 is the valve 69, controlled by a thermo-responsive element 70 arranged in proximity to the flame of the pilot burner. As long as the pilot is burning, the valve 69 remains open and the apparatus is in condition for operation, as will be later described. However, if the pilot is extinguished for any reason, gas for the control of the whole refrigeration system is immediately shut off for safety reasons.

Gas for the heater burner 54 is delivered through the pipes 71 and 72 from the main pipe 58, and it passes through a valve 73 under the control of the thermo-responsive element 74 in juxta-position to the flame of the pilot burner 75, for the heater burner, which receives its fuel directly from the pipe 58 through the tube 76. This control operates in the same manner as that described in connection with the refrigeration apparatus.

As previously stated, the adsorbers are adapted to be heated alternately, and this is effected under the control of a motor driven by the expansion of fuel gas. This motor is represented schematically at 78, and receive its fuel from the pipe 79 connected to the main fuel pipe 58. Expanded fuel is discharged or exhausted at 80. This motor is intended to run at a constant speed all the time and drives, through a suitable clutch mechanism, the cam disk 81 having on its periphery a single lobe 82 adapted to cooperate with the plungers 83 and 84 of a pair of identical pilot valves which control the flow of gas to the operating diaphragms of the main burner valves 60 and 61. Considering, for the sake of simplicity, the left-hand main and pilot valve, it will be seen that the main valve 60 has its stem connected to a diaphragm 85, which, when flexed to the left, lifts the valve from its seat and permits the flow of gas to the burner 50. The compartment behind the diaphragm 85 is connected, by the passage 86 to the central compartment 87 of the pilot valve casing which is divided into three compartments by the valve seat partitions 88 and 89 providing seats for the two oppositely disposed valves on the stem 90. Gas is arranged to be delivered by the pipe 92 into the left-hand compartment of the casing so that, when the valve stem is pushed to the left by the cam lobe 82, gas can flow from the left-hand to the central compartment and through the passage 86 to the compartment behind the diaphragm 85 of the main valve. When the plunger 83 rides off of the cam lobe, a spring, not shown, returns the valve stem to the right, which closes the left-hand valve, shutting off the flow of gas to the diaphragm compartment of the main valve and permitting the gas therein to exhaust to the central compartment of the pilot valve casing and through the right-hand valve into the right-hand compartment which is open to atmosphere. This permits the main valve to close under the tension of its diaphragm. By providing two valves in the pilot valve casing, there need be no waste of gas when the main valve is open, as is usually effected by a permanently open bleeder, for here the bleeder is valve-controlled and is closed when the main valve is open.

Interposed in the pipes 86 connecting the diaphragm compartments of the main burner valves with the central compartments of the pilot valves are safety valves 125, each of which may cut off the flow of gas to the corresponding diaphragm compartment and permit the escape of the gas therein, in case of excess pressure within the adsorbers or their manifolds. To this end, a pressure-responsive device 126 is arranged to operate each valve 125 when the adsorber pressure becomes too great. These pressure-responsive devices are connected by means of tubing 127 with the respective manifolds 31 and 32 at the check valve casings. It will be seen that if, during activation of the left-hand adsorber 30, the check valve 36 should stick and refuse to open, an excess and dangerous pressure may exist, but, before this can rupture any part of the apparatus, this pressure is transmitted through the tube 127 to the pressure-responsive device 126 which releases the pressure on the diaphragm of the corresponding main burner valve so that it closes and extinguishes the flame beneath the adsorber, thus preventing further rise in temperature and hence pressure.

Gas is supplied to the pipe 92 which feeds the pilot valves by means of the pipe 95 leading from the refrigeration control valve 96 which receives its gas through the pipe 97 connected to the pipe 68 previously mentioned as under the control of the valve 69.

The valve 96 is preferably of the poppet type and makes use of a diaphragm rather than a packing around the stem which protrudes and is provided with an operating head 100. When the valve is opened by pressure on the head 100, gas can flow from the pipe 97 to the pipe 95 and hence to the pilot valves, and thus the opening of this valve 96 may be said to place the refrigeration apparatus in condition for operation. When this valve is closed, no gas is supplied to the pilot valves, and hence the main burner valves cannot be opened so that the refrigeration apparatus is inoperative.

The valve 102, similar in construction to the valve 96, is arranged adjacent to it and is interposed between the pipes 71 and 72 leading from the main fuel pipe 58 to the heater burner 54 so that, when the valve 102 is opened, the heater is in condition to operate, but, when it is closed, the heater is deprived of gas and is inoperative. It is obvious that the valve 102 may either control the flow of gas direct to the heater burner or may be a pilot valve to actuate a larger valve as in the refrigeration apparatus. The stem of the valve 102 is provided with a head 103 for operating.

An operating stem 104 is slidably mounted over the tops of the two valves 96 and 102 and is provided with the cams 105 and 106 so spaced thereon that only one can engage a valve stem head at a time. Longitudinal motion of the operating stem is so limited that either valve may be open and the other closed, but both cannot open at the same time. In the drawings, the valve operating stem is shown as biased toward the right by means of the coil spring 108 having its right-hand end abutting against the washer 109 secured to the stem 104.

The stem 104 is movable to the left under the combined action of the expansible members 110 and 111, respectively, associated by means of tubes with the thermo-responsive elements 23 and 26. As the temperature surrounding a thermo-responsive element rises, the liquid therein is vaporized and expands the corresponding member 110 or 111 associated therewith. The member 111 has a stem 112 thereon which engages directly against the end of the stem 104 but is not secured thereto. The expansible member 110 has its stem 113 attached intermediate the ends of lever 114 having a fixed pivot 115 at its lower end and having its upper end fitting between the arms of the fork 116 on the lower end of the lever 117 pivoted intermediate its ends. The opposite end of the lever 117 is forked as at 118 around the operating stem 104 and so positioned that it can at times engage the right-hand face of the washer 109.

Assuming that the apparatus is in proper condition for operation, it will be seen that excess temperature outside of the compartment, above that of the thermo-responsive device 26, will cause an expansion of the expandable member 111 and move the operating stem 104 to the left against the action of the spring 108 and cause the cam 106 to engage the head 100 on the valve 96 to open it and put the refrigeration apparatus in condition for operation. An excess temperature within the compartment will act on the element 23 to expand the member 110 and through the two levers will press the operating stem to the left to produce the same result as if it had been moved by the outside thermal member 26.

When the refrigeration apparatus is placed in condition for operation, by the opening of the valve 96, the disk 81 will start to rotate if the temperature within the compartment 20 is too high, as will be further explained. One of the pilot valves will almost immediately be opened by the cam lobe 82 and will permit the opening of the corresponding main burner valve, so that one of the adsorbers will be activated and placed in condition for adsorption. When the pilot valve is closed by the continued movement of the disk 81, this activated adsorber will be permitted to cool and will start adsorbing, thus producing refrigeration. If insufficient reduction of temperature has taken place within the compartment 20, the disk 81 will continue to rotate until its lobe opens the other pilot valve so that the second adsorber will be heated to drive out the refrigerant. This alternate heating of the adsorbers with relatively long intervals for cooling and adsorption will continue until the temperature within the compartment is sufficiently lowered to permit contraction of the member 110 sufficiently to release contact between the fork 118 and the washer 109 on the valve operating stem 104.

If, under these conditions, the outside temperature is also sufficiently low to contract the member 111, then refrigeration will be shut off by the closure of the valve 96. If, however, the outside temperature is sufficiently high to warrant refrigeration, then the valve 96 will remain open under the action of the member 111, but the rotation of disk 81 will be stopped when the detent 120 operated by the lever 114 engages against the radial surfaces 121 of one of the notches 122 in the periphery of the disk 81. Such engagement will take place, as will be seen from the figures, only just prior to the engagement of the lobe 82 with one of the operating heads 83, 84 of the pilot valves. This is for the purpose of stopping the disk just before an activation is to take place. Any movement of the detent toward the disk prior to the conclusion of a half-rotation thereof will be ineffective to stop the disk for that requires a positive engagement of the detent with the radial surface 121. In this way the disk is insured of a half revolution after it has once started no matter what takes place within or without the compartment. This prevents partial activations and partial adsorptions and insures the regular routine of operation. It will be remembered that the motor runs constantly and that the stopping of the disk only results in a slipping of the clutch or in any other suitable mechanical operation which will permit the movement of one and not of the other of these elements.

It is to be noted that the thermo-responsive element 23 within the compartment can stop the operation of the refrigeration control disk but cannot close the valve 96 unless the temperature outside of the compartment is sufficiently low to permit this. It is further to be noted that the member 23 can start the operation of the refrigeration apparatus without the assistance of the outside thermal element. However, when the outside temperature becomes sufficiently low to require heating, the heater valve 102 is not turned on merely by the contraction of the element 111 which responds to the outside temperature. The temperature within the compartment must be sufficiently reduced to permit the contraction of the element 110 so that the control rod 104 can move to the right under the action of its spring 108.

This inter-locking arrangement of the two thermo-responsive elements permits of very accurate control of the temperature within the compartment and saves fuel which might otherwise be wasted by lowering the temperature too much or beginning the heating operation before it is necessary.

Figures 2 to 14, inclusive, illustrate a practical and commercial embodiment of the invention, incorporating the features shown in the schematic drawing and certain additional features and details of construction. Where possible, the figures of reference are identical on the diagram and on the embodiment shown in Figures 2 to 14.

In Figure 2 substantially all parts of the apparatus are visible, and the major portion of the elements are shown as housed in a casing 200 which has supported beneath it, by means of brackets, a second and smaller casing 202 containing therein the pilot burner, the ends of the jumpers, the pilot burner safety valve, and associated parts. Access is had to the pilot burner for lighting and adjustment through the door 203. A vent is shown at 204 for the escape of the products of combustion, and windows in the front and rear of the box beneath the vent provide egress for the jumpers, one of which is shown at 66 emerging from the front window 205.

In the upper or main casing are shown the motor 78; the disk 81 carried thereby; the main burner valves 60 and 61 surmounted by their pilot valves; the high pressure safety valves 125 and their pressure-responsive operating mechanisms 126.

The refrigeration control valve 96 and the heater control valve 102 are enclosed in the casing 206, but their operating mechanism is clearly visible. The expansible element 110, which is responsive to the temperature within the car, is on the outside of the casing at the lower portion thereof and is arranged to be connected by the flexible coupling 208 to the thermo-responsive element. The expansible element 111 is shown above the one 110 and is provided with a flexible tube 207 leading to the outside thermo-responsive device. The operating shafts of these expansible elements extend through the sides of the box or casing and are seen, respectively, at 112 and 113. These shafts pass through stationary threaded sleeves 209 upon which are threaded the adjusting nuts 210 which serve to compress the tension regulating springs 211 for adjusting the operating temperatures of these thermo-responsive devices. It will be understood that the pressure of the springs is transmitted to the expansible elements in the casings outside of the box in a well known manner.

The linkage associating the operating rods of the two expansible members with the refrigeration and heater control valve operating rod 104 is somewhat different than that in the schematic diagram, for it will be seen that the rod 112 operates loosely against one end of a lever 212 pivoted at 213 near its center and with its other end 214 bearing on the end of the valve operating rod 104. The operating stem 113 is threaded to receive the nut 215 embraced by the fork member 216 linked at 217 to one end of the lever 218 pivoted at 219 and having its opposite end 220 bearing on the washer 109 on the operating stem 104. It will be seen that the operation and interconnected relationship of the parts is similar to that in the diagram, and further description will be unnecessary. The valves 96 and 102 are of a well known type and are operated through the agency of the bell crank levers 222 actuated by the cams or lugs shown on the stem 104.

Figure 3 shows the apparatus of Figure 2 in side elevation. There can be seen at 225 the plate for supporting the ends of the rods 112 and 113, and the main portion of the valves 125 can be seen projecting behind the casing. It may be stated that these valves are of a well known type and are, as a matter of fact, actuated by Bourdon tubes such as shown at 126 in Figure 2. The main burner valve 60 is visible in side elevation and, since it is of a commercially available type, need not be described. The surmounting pilot valve 226 has, instead of a plunger for cooperation with the cam disk 81, a depending arm 227 pivoted at 228, as seen in Figure 4, and having an inner end 229 pressing on the valve plunger proper.

In Figures 3 and 4 is seen the stub end of the main gas line 58 which leads to the apparatus in the casing directly from the regulator 25 suitably mounted beneath the car. From this main gas pipe lead the various tubes and pipes for the control of the apparatus, as previously described. The pipe 58 leads into a manifold, not shown, in the base of the combined casing of the two main burner valves so that the passages corresponding to the pipes 56 and 57 are quite short and a great deal of piping is thus eliminated. The pipes leading from the main valves to the burners are shown projecting upwardly in Figure 4 at 230.

The gas operated motor 78 is of a conventional type in which the expansion chamber 232 is closed by a flexible diaphragm 233 and houses valve mechanism 234 operated by movement of the diaphragm so that periodic raising and lowering of the diaphragm is accomplished, thus lifting and dropping the stud 235 which acts against one end of the bell crank lever 236 pivoted at 237 and thus tensions the spring 238 when the stud is lifted to supply the energy for returning the diaphragm when the proper valve opens to exhaust gas from the chamber 232. This operation is well known and will not be touched on further.

Movement of the bell crank lever is imparted to the cam disk 81 as follows: This disk is mounted on a central shaft 239 supported by a suitable bearing 240 carried on the motor housing. The lower end of this shaft carries a gear 241 meshing with a pinion 242 mounted integral with a ratchet wheel 243 and journaled on a vertical shaft 244 pivoted between the upper and lower cone bearings 245 and 246. Journaled on the shaft 244 above the ratchet wheel 243 is a hub having two oppositely disposed arms 247, 247', extending therefrom with the arm 247 pivoted at 248 to one end of a link 249, the other end of which is pivoted by means of the adjusting mechanism shown at 250 to the upper end of the bell crank lever 236 driven by the motor diaphragm. The lever 247, thus given an oscillating motion corresponding to the movement of the diaphragm, carries on the end pivoted to the link 249 a pawl 251 actuated by a suitable spring for engaging the ratchet wheel 243 and thus driving the disk 81. A suitable non-return pawl 252 is provided supported on the vertical rod 253.

It will be remembered that means are provided to permit operation of the motor while restraining the disk 81 against rotation. In the practical embodiment of the device, this comprises two separate but interconnected elements, one of which interrupts the driving connection between the disk and motor and the other of which positively holds the disk stationary. To stop the driving of the disk, a shield for the pawl 251 is provided. This takes the form of a sector 255 loosely pivoted on the shaft 244 just beneath the hub which carries the arms 247, 247', so that it rests on the upper surface of the ratchet wheel 243. This sector has a dependent rim portion 256 of such a diameter that it just fits loosely over the tops of the teeth on the ratchet wheel. It will be seen that, if this shield member is rotated clockwise from the position shown in Figure 11, the pawl can engage the ratchet wheel and rotate it, but, if it is shifted to the position shown in that figure, it will come between the ratchet teeth and the pawl, and the pawl will ride idly on its periphery.

The sector is provided with an extending arm 257 slotted as at 258 to receive the lower end 259 of the substantially vertical arm of a bell crank lever 260 pivoted at 261 on the bracket 262 and having the other arm 263 provided with dog-like end 264 which normally rides idly on the lower surface of a rib 265 on the under side of the disk 81, which holds the lower end of the lever 260 to the left of the position shown in Figure 9, against the action of the spring 266, so that the shield is removed from beneath the pawl 251, and the motor is free to drive the disk.

At two positions 180° apart on the rib 265 are the notches 270 which provide depressions for the dog 264, into which it can drop under the action of its spring 266. When this action takes place, the lower end of the lever, to which it is attached, rotates the shield into position to prevent engagement of the pawl 251 with the ratchet wheel 243 so that the disk comes to a stop and remains stopped until the lever 260 is actuated to release the disk and withdraw the shield. The purpose of this mechanism just described is to stop the disk every half revolution in case the temperature within the cooled compartment is such as not to require further refrigeration. It also has the purpose of insuring a full half revolution of the disk once it is started sufficiently to engage the lower surface of the rib with the tip of the dog 264, for then nothing can stop the action of the disk until it has completed a half revolution.

In order to start the disk after it has been stopped, with the arm 260 held against the stop screw 272 by its spring 266, a connection is provided with the operating rod 113 of the thermo-responsive element actuated in accordance with the temperature within the car compartment. As seen in Figures 6 and 7, a bracket carried by the motor casing supports a tubular guide 275 in which slides a pin 276 linked as shown at 277 in Figure 2 to the adjustable member 278 on the end of the rod 113 so that movement of the rod is imparted to the pin 276. As best seen in Figure 7, this pin has a conical end 273 which engages against the cam surface 279 on the arm 280 pivoted at 281. This arm has a face 282 which engages against the edge of the depending portion of the lever 260 so that it can throw it out of the position shown in Figure 9 to place the disk in condition for rotation. This operation can readily be understood by viewing Figure 7, where it will be seen that the lever 260 can be moved upwardly by an outward movement of the rod 113 resulting from increased temperature in the compartment, which is equivalent to moving it to the left in Figure 9. The several mechanisms just described disclose the control of the car thermostat over the rotation of the disk which carries the cam for actuating the burner valves. It will be seen that, if the temperature within the car remains too high, the disk will not even stop when a notch 270 in the rib 265 comes over the dog 264, for this dog will not be able to move into the depression. It will further be seen that, no matter how far the pin 276 is withdrawn, the dog 264 can have no action until a notch 270 moves into position to receive it.

The cam for actuating the pilot valve arms 227 is more complex than that shown on the schematic view. The upper surface of the disk 81 is provided with a circumferential rib 290, against the outer periphery of which the arms 227 bear, as seen in Figure 2, to hold the pilot valves in a position to cut off gas to the diaphragm compartments of the main burner valves. As seen in Figure 7, this rib is cut away between the points 291 and 292, and mounted on the disk between these points is the actuating member 293 which has the vertical walls 294 and 295. That portion 296 of the wall 294 extends outwardly to lead the arm 227 which has been bearing on the wall 290 inwardly, so that it is brought into engagement with the circumferential portion 297 of the wall 294 which holds the arm in such a position that the pilot valve is held open during the proper length of time for activating an adsorber as determined by the length of the surface 297. When the surface 297 passes off of the arm, the arm is then engaged by the outer surface 298 of the wall 295 which cams it outwardly until it again bears on the outer periphery of the wall 290.

There is a certain phase relationship between the position of this member 293 for actuating the pilot valve arms and the positions of the notches 270 on the depending rib 265, so that in every case the disk is caused to stop under the action of the dog 264 just before the arm on one of the pilot valves is moved inwardly by the surface of the part 296. As before stated, this insures that, as soon as the disk starts, an activation is initiated so that no time is wasted in bringing about refrigeration when it is required, as indicated by the temperature within the compartment.

It is desirable that a record be kept of temperatures within the car compartment, and this can readily be done by combining the movement of the motor, which runs constantly, with the movement of the thermo-responsive element actuated by the car temperature. For this purpose the motor is caused to move a tape on which a mark is made by a lever associated with the actuating stem 113 under the control of the expansible member 110 connected with the thermo-responsive element 23 within the compartment.

As seen in Figures 2 and 12, there is mounted on a stud 300, carried from the bottom of the casing 200, a cylindrical tape casing 301, which is shown enlarged in Figure 14, to receive and enclose a roll of paper ribbon 302 or tape which is permitted to pass to the outside of the casing through the slot 303. The tape is adapted to be wound upon a spindle 304 pivoted in a vertical position at 305 and 306 in a bracket 307 carried by the motor casing. This spindle supports a large spur gear 308 which meshes with an idler gear 309 mounted on stud 310 carried from the casing of the motor. This idler gear meshes with a pinion 311 secured on the shaft 244, previously referred to in connection with the ratchet drive for the cam disk. This pinion 311 is below and forms the lower abutment for the pinion 242 which rotates loosely on the shaft 244. The shaft 244 has also secured to it a ratchet wheel 312 similar to the ratchet wheel 243 and above that wheel. It is driven, as shown in Figure 10, by a pawl 313 mounted on the arm 247', previously referred to, and driven by means of the link 249 from the motor. A non-return pawl 314 is provided for this ratchet wheel and mounted on the same rod 253 which carries the non-return pawl for the ratchet wheel 243. No means is provided to release the pawl 313 from its ratchet wheel so that the tape spindle 304 is always driven, for the motor runs constantly. A suitable clamp 315 is provided for holding the end of the tape against the spindle 304 so that it can be wound up.

It will be noticed from Figures 12, 13, and 14 that, as the tape is drawn out from the casing, it passes over the outer surface thereof for a portion of its periphery, which provides a convenient table or supporting surface for marking on the tape. Friction is applied to the tape as it emerges from the casing by means of a spring member 316 which has a bight 317 bearing against the tape where it is pressed against the outer surface of the casing 301. The tape is preferably of a particular sensitized type which can be marked by means of a brass or copper marker. Such tape is well known, and it will be seen that not only is suitable friction applied to the tape by means of the bight 317, but a datum line is drawn on the tape by this same means.

The spindle for winding up the tape, while rotating at a constant speed, will not impart uniform linear motion to the tape since, as the tape winds up on the spindle, the circumference of the tape drive cylinder increases, and the speed will thus increase. In order, therefore, that definite time intervals may be marked on the tape, the light lever 320 is pivoted near its center at 321 in a bracket carried by the stud 300 and has at its right-hand end a marker 322 held pressed in engagement with the surface of the tape by means of the spring 323. The lever 320 has an upstanding portion 324 on its left-hand end with a rounded top surface 325 bearing beneath the periphery of the gear wheel 308 under the action of the spring 325'. This wheel is provided with a stud 326 projecting through this surface so that once per revolution it engages with the rounded end 325 and causes the marker 322 to make a substantially vertical mark on the tape. It will be seen that these marks will have a definite space interval between them, which can readily be converted to time for considering the action of the device.

Referring now to Figure 2, it will be seen that the fork 216, which surrounds the adjustable nut 215 on the operating stem 113 of the expansible element 110, has a depending arm 328 which is constrained to move parallel to itself by reason of the fork tightly engaging the faces of the nut. A portion of this arm is shown in Figure 12 with its lower end bifurcated and straddling a pin 329 on the short vertical arm 330 of a bell crank lever pivoted at 331 to a stationary bracket 331' and having the substantially horizontal arm 332 which passes behind the tape casing 301 and has secured to its end, and substantially at right angles thereto, the arm 333, also substantially horizontal, having the curved end 334 carrying a spring pressed marker 335 which bears on the tape near the bight 317.

It will be seen that, as the rod 113 moves in and out, it will cause corresponding vertical movement of the marker 335 to mark on the tape a continuous record of the position of this operating rod which corresponds exactly to the temperatures within the compartment on the car as affecting the thermo-responsive element 23. If desired, the datum marker may be adjusted vertically on the supporting rod 336, to correspond to the temperature at which the element 110 is set by means of its adjusting nut 210 which operates the marker 338 which moves along the graduated scale 339. In this way the variations of the internal temperature from that desired appear by the crossing of the line marked by the pointer 335 over the datum line.

The number of activations will not be directly indicated by the chart on the tape for, if the temperature within the car remains too high, there may be several activations with no movement of the rod 113 which would indicate such on the tape. It is sometimes desirable to know how many activations have taken place as an indication of the quantity of fuel remaining, and this can readily be obtained by mounting a simple counter, such as shown at 341 in Figure 6, on the motor and driving the gear 342 of the counter by having it mesh with the gear 241 on the lower end of the shaft 239 driving the disk 81. If the gear on the counter is made with half the number of teeth of the gear 241, the counter will count activations instead of revolutions of the disk 81 since there are two activations per revolution.

Having thus described the invention, what is claimed as new and desired to be secured by Letters Patent is:

1. The method of maintaining a substantially constant temperature within a compartment comprising controlling the selection of cooling apparatus by the temperature without the compartment, controlling the operation of the cooling apparatus by the temperature within the compartment, and controlling the selection of heating apparatus jointly by the temperatures within and without the compartment.

2. The method of maintaining a substantially constant temperature within a compartment comprising controlling the selection of cooling apparatus jointly by the temperatures within and without the compartment, controlling the operation of the cooling apparatus by the temperature within the compartment, and controlling the selection of heating apparatus jointly by the temperatures within and without the compartment.

3. The method of maintaining a substantially constant temperature within a compartment comprising controlling the selection of cooling apparatus by the temperature without the compartment, controlling the operation of the cooling apparatus by the temperature within the compartment, and controlling the selection and operation of heating apparatus jointly by the temperatures within and without the compartment.

4. The method of maintaining a substantially constant temperature within a compartment comprising controlling the selection of cooling apparatus jointly by the temperature within and without the compartment, controlling the operation of the cooling apparatus by the temperature within the compartment, and controlling the selection and operation of heating apparatus jointly by the temperatures within and without the compartment.

5. The method of maintaining a substantially constant temperature within a compartment comprising controlling the selection of heating or cooling apparatus by the temperature without the compartment, cyclically operating the cooling apparatus, controlling the initiation of the cycles by the temperature within the compartment, and controlling the heating apparatus by the temperatures within and without the compartment.

6. In a system for maintaining a substantially constant temperature in a compartment, the combination of refrigeration apparatus including a cooling means and a part requiring heat, heating apparatus including heat distributing means and a part requiring heat, means dependent on temperatures without and within the compartment to associate a source of heat with the part requiring it, and means to control the application of the heat to the refrigeration apparatus in accordance with the temperature within the compartment.

7. In a system for maintaining a substantially constant temperature in a compartment, the combination of refrigeration apparatus including a cooling means and a part requiring heat, heating apparatus including heat distributing means and a part requiring heat, and means dependent on temperatures without and within the compartment to associate a source of heat with the part requiring it.

8. In a system for maintaining a substantially constant temperature in a compartment, the combination of refrigeration apparatus of the cyclically operating, adsorption type including a cooling means and an adsorber requiring occasional heating, heating apparatus including heat distributing means and a part requiring heat, means responsive to the temperature within and without the compartment to associate a source of heat with the adsorber, and means dependent jointly on the temperature within and without the compartment to associate a source of heat with the heating apparatus.

9. In a system for maintaining a substantially constant temperature in a compartment, the combination of refrigeration apparatus of the cyclically operating, adsorption type including a cooling means and an adsorber requiring occasional heating, heating apparatus including heat distributing means and a part requiring heat, means responsive to the temperature within and without the compartment to associate a source of heat with the adsorber, means dependent jointly on the temperature within and without the compartment to associate a source of heat with the heating apparatus, and means controlling the initiation of each phase of heating of the adsorber dependent on the temperature within the compartment.

10. In a system for maintaining a substantially constant temperature in a compartment, the combination of refrigeration apparatus of the adsorption type including a cooling means and a part requiring heat to vaporize the refrigerant, heating apparatus including heat distributing apparatus and a part requiring heat, means responsive to the temperatures within and without the compartment to associate a source of heat with the refrigeration part, and means responsive to both the temperature within and without the compartment to associate a source of heat with the heater part.

11. In a system for maintaining a substantially constant temperature in a compartment, the combination of refrigeration apparatus of the adsorption type including a cooling means and a part requiring heat to vaporize the refrigerant, heating apparatus including heat distributing apparatus and a part requiring heat, means responsive to the temperatures within and without the compartment to associate a source of heat with the refrigeration part, means responsive to both the temperature within and without the compartment to associate a source of heat with the heater part, and means actuated by the temperature within the compartment to regulate the delivery of heat to the refrigeration part.

12. In a system for maintaining a substantially constant temperature in a compartment, the combination of refrigeration apparatus of the adsorption type including a cooling means and a part requiring heat to vaporize the refrigerant, heating apparatus including heat distributing apparatus and a part requiring heat, a burner for each of said parts, a valve for each burner to control the flow of fuel thereto, means associated with said valves adapted to actuate one valve at a time, means responsive to temperatures within the compartment, means responsive to temperatures without the compartment, and means interlocking said temperature responsive means and associating them operatively with said valves.

13. Apparatus for maintaining a substantially constant temperature in a compartment, including, in combination, a refrigeration apparatus having a part requiring heat, a burner for said part, a heating apparatus having a part requiring heat, a burner for said last-mentioned part, a valve for each burner to associate the same with a source of fuel, an operator for said valves arranged to open but one at a time and biased to open said second mentioned valve, and means responsive to rise in temperature within and without the compartment to move said operator to open said first-mentioned valve, said temperature responsive means being so associated with said operator that both must respond to lowered temperatures to permit the biasing means to open the heater burner valve.

14. Apparatus for maintaining a substantially constant temperature in a compartment, including, in combination, a refrigeration apparatus having a part requiring heat, a burner for said part, a heating apparatus having a part requiring heat, a burner for said last-mentioned part, a valve for each burner to associate the same with a source of fuel, an operator for said valves arranged to open but one at a time, means responsive to rise in temperature within the compartment to move said operator to open said first-mentioned burner valve, means responsive to rise in temperature without the compartment for modifying the action of said first-mentioned temperature responsive means, both of said temperature responsive means being so associated with said operator that both must respond to lowered temperatures to permit the opening of said second mentioned valve, and means controlled by said first-mentioned temperature responsive means to regulate the flow of fuel to the refrigeration burner when its valve is open.

15. Apparatus for regulating the temperature in a compartment, comprising, in combination, refrigeration apparatus having a fuel burner, heating apparatus having a fuel burner, a valve for each burner, a selective operator for said valves, and a pair of temperature responsive means, each associated with said operator to determine the position thereof with respect to said valves in accordance with temperature conditions within and without said compartment, each of said temperature responsive means modifying the action of the other.

16. Apparatus for regulating the temperature in a compartment, comprising, in combination, refrigeration apparatus having a fuel burner, heating apparatus having a fuel burner, a valve for each burner, a selective operator for said valves, a pair of temperature responsive means, each associated with said operator to determine the position thereof with respect to said valves in accordance with temperature conditions within and without said compartment, each of said temperature responsive means modifying the action of the other, and means controlled by one of said temperature responsive means to regulate the flow of fuel to the refrigeration burner when its valve is open.

17. Apparatus for regulating the temperature in a compartment, comprising, in combination, refrigeration apparatus having a fuel burner, heating apparatus having a fuel burner, a valve for each burner, a selective operator for said valves, a pair of temperature responsive means, each associated with said operator to determine the position thereof with respect to said valves in accordance with temperature conditions within and without said compartment, each of said temperature responsive means modifying the action of the other, timed means to periodically permit the flow of fuel to the refrigeration burner when the refrigeration burner valve is open, and means actuated by one of said temperature responsive means to stop said timed means.

18. Apparatus for regulating the temperature in a compartment, comprising, in combination, refrigeration apparatus having a fuel burner, a continuously operating motor, means driven by said motor to permit a supply of fuel to said burner periodically, means to dissociate said motor and driven means just prior to each fuel delivery phase, and means responsive to temperature rise in the compartment to prevent the said dissociation.

19. Apparatus for regulating the temperature in a compartment, comprising, in combination, refrigeration apparatus having a fuel burner, a continuously operating motor, means driven by said motor to permit a supply of fuel to said burner periodically, means to dissociate said motor and driven means just prior to each fuel delivery phase, and means responsive to temperature rise in the compartment to reassociate the motor and driven means.

20. Apparatus for regulating the temperature in a compartment, comprising, in combination, refrigeration apparatus having a fuel burner, a continuously operating motor, means driven by said motor to permit a supply of fuel to said burner periodically, means actuated by said driven means to dissociate it from the motor once per cycle, and means responsive to temperature in said compartment to prevent the dissociation or to reassociate the parts in accordance with the temperature requirements in the compartment.

21. Apparatus for regulating the temperature in a compartment, comprising, in combination, a refrigeration apparatus of the cyclically operating type having an adsorber, a heater for said adsorber, a continuously operating motor mechanism, means driven by said motor to operate the heater intermittently, one phase per refrigeration cycle, means operated by said driven means to disconnect the motor therefrom once per cycle, a thermo-responsive element associated with said last-mentioned means to disable it when the temperature in said compartment is too high, and heating apparatus for said compartment under the control of said thermo-responsive means.

22. Apparatus for regulating the temperature in a compartment, comprising, in combination, a refrigeration apparatus of the cyclically operating type having an adsorber, a heater for said adsorber, a continuously operating motor mechanism, means driven by said motor to operate the heater intermittently, one phase per refrigeration cycle, means operated by said driven means to disconnect the motor therefrom once per cycle, a thermo-responsive element associated with said last-mentioned means to disable it when the temperature in said compartment is too high, heating apparatus for said compartment under the control of said thermo-responsive means, a second thermo-responsive element subject to temperatures outside of said compartment, and means superposing the control of said last-mentioned thermo-responsive element on the control of the first mentioned thermal-element to control said heating apparatus.

23. Apparatus for regulating the temperature in a compartment, comprising, in combination, a refrigeration apparatus of the cyclically operating type having an adsorber, a heater for said adsorber, a continuously operating motor mechanism, means driven by said motor to operate the heater intermittently, one phase per refrigeration cycle, means operated by said driven means to disconnect the motor therefrom once per cycle, a thermo-responsive element associated with said last-mentioned means to disable it when the temperature in said compartment is too high, heating apparatus for said compartment under the control of said thermo-responsive means, and a second thermo-responsive element subject to temperatures outside of said compartment, said second thermo-responsive element adapted to modify the action of said first-mentioned thermo-responsive element.

24. Apparatus for regulating the temperature in a compartment, comprising, in combination, a refrigeration apparatus of the cyclically operating type having an adsorber, a heater for said adsorber, a continuously operating motor mechanism, means driven by said motor to operate the heater intermittently, one phase per refrigeration cycle, an element responsive to the temperature in said compartment, and means associated with said element and driven means to stop the driven means once per cycle if the compartment temperature is too low.

25. Apparatus for regulating the temperature in a compartment, comprising, in combination, a refrigeration apparatus of the cyclically operating type having an adsorber, a heater for said adsorber, a continuously operating motor mechanism, means driven by said motor to operate the heater intermittently, one phase per refrigeration cycle, an element responsive to the temperature in said compartment, means associated with said element and driven means to stop the driven means once per cycle if the compartment temperature is too low, and means to supply heat to said compartment under the control of said thermo-responsive element.

26. In a refrigeration system, in combination, an adsorber, a gaseous fuel burner for said adsorber, a source of fuel under pressure, a valve between said source and burner to control the fuel flow, a diaphragm closing a chamber and normally holding said valve closed, and a two-way pilot valve adapted to selectively associate said chamber and said source or said chamber and atmosphere.

27. In a refrigeration system, in combination, an adsorber, a gaseous fuel burner for said adsorber, a source of fuel under pressure, a valve between said source and burner to control the fuel flow, a diaphragm closing a chamber and normally holding said valve closed, a two-way pilot valve adapted to selectively associate said chamber and said source or said chamber and atmosphere, and means actuated by excess pressure in said adsorber to vent said chamber to atmosphere.

28. In a refrigeration system, in combination, an adsorber, a gaseous fuel burner for said adsorber, a pilot burner for said adsorber burner, a source of fuel under pressure, a valve between said source of fuel and burner to control the fuel flow thereto, a diaphragm closing a chamber and normally closing said valve, a two-way valve connected to said source of fuel and adapted to associate it with said chamber or the chamber with atmosphere, a thermo-responsive element associated with said pilot burner, a valve between said source and two-way valve, said valve being opened by said thermo-responsive element when heated and vice-versa.

29. In refrigeration apparatus, in combination, means forming a space whose temperature is to be regulated, a refrigeration unit of the adsorber type for said space, means for applying heat to said absorber in proportion to the quantities of a heat energy producing substance supplied thereto, means operated by said heat energy producing substance for cyclically controlling the quantities of said heat energy producing substance supplied to said last-mentioned means, and means for regulating the quantity of said heat energy producing substance supplied to said controlling means in accordance with temperature conditions inside said space and outside said space.

30. In refrigeration apparatus, in combination, means forming a space whose temperature is to be regulated, a refrigeration unit of the adsorber type for said space, means for applying heat to said absorber in proportion to the quantities of a heat energy producing substance supplied thereto, means operated by said heat energy producing substance for cyclically controlling the quantities of said heat energy producing substance supplied to said last-mentioned means, means for controlling the quantity of said heat energy producing substance supplied to said controlling means in accordance with the temperature outside said space, and means for modifying the action of said last-mentioned means in accordance with the temperature inside said space.

31. In refrigeration apparatus, in combination, means forming a space whose temperature is to be regulated, a refrigeration unit of the adsorber type for said space, a gas burner for supplying heat to said adsorber, a source of gas for said burner, means connecting said source with said burner, a valve in said last-mentioned means, gas actuated means for cyclically opening said valve, means connecting said last-mentioned means with said gas source, a controlling valve disposed in said last-mentioned means and means for controlling the operation of said last-mentioned valve in accordance with temperature conditions inside said space and outside said space.

32. In refrigeration apparatus, in combination, means forming a space whose temperature is to be regulated, a refrigeration unit of the adsorber type for said space, a gas burner for supplying heat to said adsorber, a source of gas for said burner, means connecting said source with said burner, a valve in said last-mentioned means, gas actuated means for cyclically opening said valve, means connecting said last-mentioned means with said gas source, a controlling valve disposed in said last-mentioned means, means for controlling the operation of said last-mentioned valve in accordance with temperature conditions outside said space, and means for modifying the action of said last-menioned means in accordance with temperature conditions inside said space.

33. In refrigeration apparatus, in combination, means forming a space whose temperature is to be regulated, a refrigeration unit of the adsorber type for said space, a gas burner for supplying heat to said adsorber, a source of gas for said burner, means connecting said source with said burner, a valve in said last-mentioned means, continuously operating gas-actuated means for cyclically opening said valve, means connecting said last-mentioned means with said gas source, a controlling valve disposed in said last-mentioned means, means for controlling the operation of said last-mentioned valve in accordance with temperature conditions outside said space, and means for stopping the operation of said continuously operating means when the temperature of said space falls below that preferred.

34. In refrigeration apparatus, in combination, means forming a space whose temperature is to be regulated, a refrigeration unit of the adsorber type for said space, a gas burner for supplying heat to said adsorber, a source of gas for said burner, means connecting said source with said burner, a valve in said last-mentioned means, continuously operating gas actuated means for cyclically opening said valve, means connecting said last-mentioned means with said gas source, a controlling valve disposed in said last-mentioned means, means for controlling the operation of said last-mentioned valve in accordance with temperature conditions outside said space, and means responsive to the temperature inside said space for modifying the action of said last-mentioned means and stopping said continuously operating means when the temperature of said space falls below that preferred.

35. In refrigeration apparatus, in combination, a refrigeration unit of the adsorber type, a burner for supplying heat to said adsorber, a source of fuel supply for said burner, a valve for controlling the flow of said fuel to said burner, means for cyclically opening said valve at definite time intervals, and an actuating part responsive to the pressure in said adsorber for closing said valve when the pressure in said adsorber reaches a certain point.

36. In refrigeration apparatus, the combination with an adsorber, a condenser, an evaporator, and piping connecting said parts, of a source of fuel, a burner connected to said source of fuel and adapted to heat said adsorber, a pressure-responsive device associated with said adsorber and adapted to be actuated by the pressure developed therein, a valve disposed between said source of fuel and said burner adapted to turn on and shut off said burner at definite time intervals, and means adapted to be acted upon by said pressure-responsive device upon occurrence of excessive pressure in said adsorber to close said valve.

GEORGE E. HULSE.

CERTIFICATE OF CORRECTION.

Patent No. 2,004,503.　　　　　　　　　　　　　　　June 11, 1935.

GEORGE E. HULSE.

It is hereby certified that error appears in the printed specification of the above numbered patent requiring correction as follows: Page 3, first column, line 15, for "receive" read receives; page 4, first column, line 54, for "figures" read figure; page 8, second column, line 10, claim 14, strike out the word "burner"; and page 10, first column, line 49, claim 32, for "last-menioned" read last-mentioned; and that the said Letters Patent should be read with these corrections therein that the same may conform to the record of the case in the Patent Office.

Signed and sealed this 16th day of July, A. D. 1935.

Leslie Frazer (Seal)　　　　　　　　　　　　　　　　　　　　Acting Commissioner of Patents.